(12) United States Patent
Yu et al.

(10) Patent No.: US 11,827,104 B2
(45) Date of Patent: Nov. 28, 2023

(54) SUNKEN WHEEL-SIDE MOTOR DRIVE AXLE

(71) Applicant: Jing-Jin Electric Technologies Co., Ltd., Beijing (CN)

(72) Inventors: Ping Yu, Beijing (CN); Zhongyang Chen, Beijing (CN); Yang Lu, Beijing (CN); Kuizhu Shao, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 51 days.

(21) Appl. No.: 17/597,384

(22) PCT Filed: May 15, 2020

(86) PCT No.: PCT/CN2020/090484
§ 371 (c)(1),
(2) Date: Jan. 4, 2022

(87) PCT Pub. No.: WO2021/082399
PCT Pub. Date: May 6, 2021

(65) Prior Publication Data
US 2022/0242223 A1    Aug. 4, 2022

(30) Foreign Application Priority Data
Nov. 1, 2019    (CN) .......................... 201911060137.5

(51) Int. Cl.
*B60K 7/00*     (2006.01)
*B60K 17/04*    (2006.01)

(52) U.S. Cl.
CPC .......... *B60K 7/0007* (2013.01); *B60K 17/046* (2013.01); *B60K 2007/0092* (2013.01)

(58) Field of Classification Search
CPC ................ B60K 7/0007; B60K 17/046; B60K 2007/0092
See application file for complete search history.

(56) References Cited

U.S. PATENT DOCUMENTS 1,251,749 A * 1/1918 Cilley .................. B60K 17/046
                                                180/65.6
1,728,889 A * 9/1929 Kemble ................. B60K 17/36
                                                180/65.6

(Continued)

FOREIGN PATENT DOCUMENTS

| CN | 203410439 A | 1/2014 |
| CN | 104290721 A | 1/2015 |

(Continued)

OTHER PUBLICATIONS

Supplemental European Search Report, dated Aug. 8, 2022, issued in corresponding European Patent Application No. 120882839.2.

(Continued)

*Primary Examiner* — Erez Gurari
(74) *Attorney, Agent, or Firm* — ArentFox Schiff LLP

(57) ABSTRACT

A sunken wheel-side motor drive axle that includes an axle beam assembly, two drive motor assemblies, two reducer assemblies and two hub assemblies. The two drive motor assemblies, two reducer assemblies and two hub assemblies are respectively disposed at left and right ends of the axle beam assembly. Moreover, the drive motor assemblies are symmetrically disposed at a bottom of the left and right ends of the axle beam assembly respectively; and the drive motor assemblies transmit power to the reducer assemblies, and the reducer assemblies drive the hub assemblies to rotate.

16 Claims, 1 Drawing Sheet

(56) References Cited

U.S. PATENT DOCUMENTS

| | | | | |
|---|---|---|---|---|
| 2,027,218 | A * | 1/1936 | Armington | B61C 9/38 |
| | | | | 105/100 |
| 3,693,745 | A * | 9/1972 | Petrov | B60K 1/00 |
| | | | | 310/67 R |
| 3,862,667 | A * | 1/1975 | Wolansky | B60K 17/30 |
| | | | | 180/254 |
| 7,353,904 | B2 * | 4/2008 | Phillips | A01D 34/6806 |
| | | | | 180/308 |
| 7,363,995 | B2 * | 4/2008 | Downs | B60K 17/043 |
| | | | | 180/65.6 |
| D883,864 | S * | 5/2020 | Baillie | D12/159 |
| 10,690,234 | B1 * | 6/2020 | Oury, Jr. | B60K 11/02 |
| 2006/0158024 | A1 * | 7/2006 | Wendl | B60K 7/0007 |
| | | | | 301/137 |
| 2008/0018064 | A1 * | 1/2008 | Martin | B60G 17/017 |
| | | | | 280/124.128 |
| 2012/0103708 | A1 * | 5/2012 | Hennings | B60K 7/0007 |
| | | | | 180/65.6 |
| 2014/0345959 | A1 * | 11/2014 | Mair | B60K 11/02 |
| | | | | 180/55 |
| 2017/0063202 | A1 * | 3/2017 | Caron | H02K 7/102 |
| 2020/0180426 | A1 * | 6/2020 | Chopra | B60K 17/04 |
| 2020/0276895 | A1 * | 9/2020 | Mepham | B60K 17/046 |
| 2021/0061093 | A1 * | 3/2021 | Li | B60B 35/002 |
| 2021/0155072 | A1 * | 5/2021 | Abram | B60K 1/02 |
| 2021/0379983 | A1 * | 12/2021 | Baillie | B60K 1/02 |
| 2021/0379984 | A1 * | 12/2021 | DeVeny | B60K 11/02 |
| 2022/0242223 | A1 * | 8/2022 | Yu | B60K 17/046 |
| 2022/0320946 | A1 * | 10/2022 | Varela | H02K 9/19 |
| 2022/0396140 | A1 * | 12/2022 | Varela | B60K 1/00 |

FOREIGN PATENT DOCUMENTS

| | | |
|---|---|---|
| CN | 104908581 A | 9/2015 |
| CN | 206306826 U | 7/2017 |
| CN | 207088967 U | 3/2018 |
| CN | 110722969 A | 1/2020 |
| DE | 29518401 U1 | 3/1997 |
| WO | 2013119047 A | 8/2013 |
| WO | 2013173915 A | 11/2013 |

OTHER PUBLICATIONS

ISA/CN, International Search Report and Written Opinion dated Aug. 19, 2020 issued in PCT/CN2020/090484.

* cited by examiner

SUNKEN WHEEL-SIDE MOTOR DRIVE AXLE

CROSS-REFERENCE TO RELATED APPLICATIONS

This application is a National Phase of PCT/CN2020/090484, filed on May 15, 2020, which claims priority to Chinese Patent Application No. 201911060137.5, filed on Nov. 1, 2019, the disclosures of each of which are hereby incorporated by reference in their entireties.

TECHNICAL FIELD

The present disclosure relates to the field of new energy vehicles, in particular to a sunken wheel-side motor drive axle.

BACKGROUND

With the gradual depletion of oil resources and increasingly worsening of air pollution, the call for new energy vehicles, such as pure electric, hybrid, and fuel cell vehicles, is getting louder. The emergence of new energy vehicles has greatly reduced the dependence on oil and air pollution. Compared with the conventional internal combustion engine vehicle, due to the different forms of energy supply, great changes have made on both the vehicle layout structure and the drive system assembly in new energy vehicles. The drive system assembly is very important for the vehicle; it not only undertakes the load-bearing function and drive function, but also directly determines the safety and comfort performance of the vehicle.

At present, the aisle width of new energy commercial buses provided with a wheel-side motor drive axle is determined by the distance between the left and right drive motor end faces of the wheel-side motor drive axle. However, in order to ensure large driving torque, the size of the drive motor is made large, which reduces the distance between the two drive motor end faces of the wheel-side motor drive axle, and further results in smaller bus aisle width and low comfort of passengers.

SUMMARY

In view of the above problems, the present disclosure provides a sunken wheel-side motor drive axle to solve or partially solve the above problems.

In order to achieve the above object, the present disclosure adopts the following technical solutions.

An aspect of the present disclosure provides a sunken wheel-side motor drive axle, which comprises an axle beam assembly, two drive motor assemblies, two reducer assemblies and two hub assemblies, the two drive motor assemblies, two reducer assemblies and two hub assemblies are respectively disposed at left and right ends of the axle beam assembly;

the drive motor assemblies are symmetrically disposed at a bottom of the left and right ends of the axle beam assembly respectively; and the drive motor assemblies transmit power to the reducer assemblies, and the reducer assemblies drive the hub assemblies to rotate.

Further, the drive motor assembly comprises an oil-cooled motor with small diameter, high power density and high rotation speed.

Further, the reducer assembly is provided with a brake air chamber, the brake air chamber cooperates with a brake disc, and a bus aisle width is limited by the brake air chambers.

Further, the brake discs are disposed at an inner side of the hub assembly.

Further, the reducer assembly comprises two first-stage reducer assemblies, two second-stage reducer assemblies and two third-stage reducer assemblies, and the first-stage reducer assemblies, the second-stage reducer assemblies and the third-stage reducer assemblies are arranged symmetrically on the left and right.

Further, an output shaft of the drive motor assembly is connected with a driving gear of the first-stage reducer assembly through splines, and a driven gear output shaft of the first-stage reducer assembly is connected with a driving gear of the second-stage reducer assembly, a driven gear of the second-stage reducer assembly transmits power to an input end of the third-stage reducer assembly; the second-stage reducer assembly comprises a driving gear, an intermediate shaft and a driven gear, and the intermediate shaft is meshed with the driving gear and the driven gear respectively.

Further, the driven gear of the second-stage reducer assembly and the driving gear of the second-stage reducer assembly are eccentrically arranged.

Further, an input end and an output end of the third-stage reducer are located on a same side, the third-stage reducer comprises a sun gear, a planet gear and a ring gear, the sun gear is driven by the driven gear of the second-stage reducer assembly, the planet gear is meshed with the sun gear and fixed on a planet carrier, the planet gear is meshed with the ring gear, and the ring gear is meshed with a gear disc on the hub assembly to drive the hub assembly to rotate.

Further, the drive motor assembly, the first-stage reducer assembly and the second-stage reducer assembly are lubricated by a spray condensation integrated cooling and lubrication system.

Another aspect of the present disclosure provides a new energy vehicle comprising any one of the sunken wheel-side motor drive axles as stated above.

The sunken wheel-side motor drive axle has the following advantages.

By arranging the drive motor assembly at the bottom of the axle beam assembly and using multi-stage reducers, the present disclosure reduces requirement for the torque output of the drive motor while ensuring the same wheel-side drive torque, and further effectively reduces the size of the drive motor and reduces the space occupied by the drive motor assembly, and makes the boundary of the brake air chambers a decisive factor for limiting the bus aisle width. Therefore, the wheel-side motor drive axle provided by the present disclosure can effectively increase the bus aisle width and improve the comfort of passengers.

Figure 1:
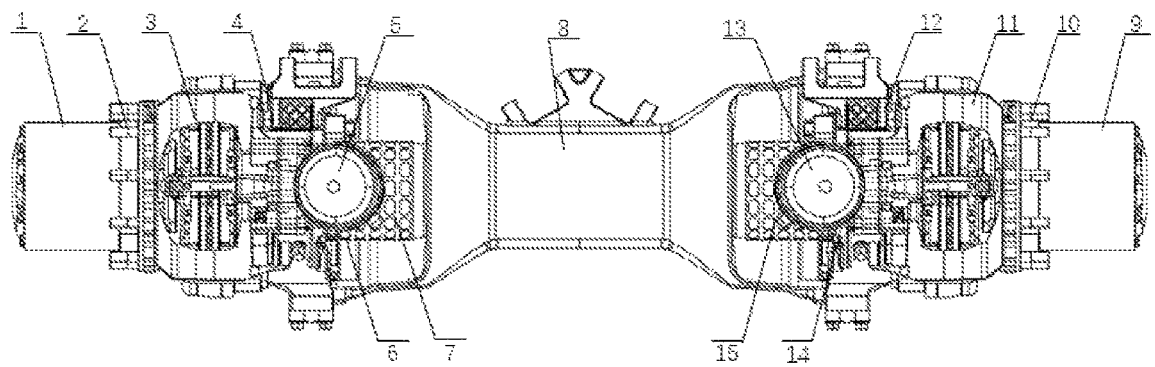
FIG. 1 shows a top view of a sunken wheel-side motor drive axle in an embodiment of the present disclosure.

In the drawings: 1. left third-stage reducer assembly; 2. left hub assembly; 3. left brake disc; 4. left second-stage reducer assembly; 5. left brake air chamber; 6. left first-stage reducer assembly; 7. left drive motor assembly; 8. axle beam assembly; 9. right third-stage reducer assembly; 10. right hub assembly; 11. right brake disc; 12. right second-stage reducer assembly; 13 right brake air chamber; 14. right first-stage reducer assembly; 15. right drive motor assembly; A. boundary between left and right brake air chambers symmetrically disposed.

DETAILED DESCRIPTION

Illustrative embodiments of the present disclosure will be described in more detail with reference to the drawings. Although the drawings show the illustrative embodiments of the present disclosure, it should be understood that the present disclosure can be implemented in various ways and should not be limited by the embodiments disclosed herein. On the contrary, the embodiments are provided for a more thorough and complete understanding of the present disclosure, so as to fully convey the scope of the present disclosure to a person skilled in the art.

First Embodiment

Figure 2:
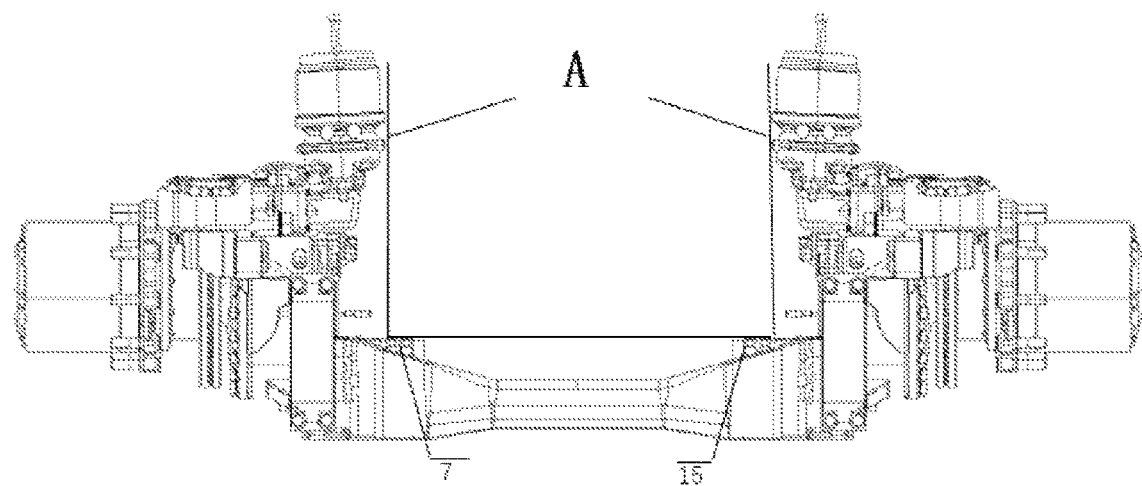
FIG. 2 shows a front view of a sunken wheel-side motor drive axle in an embodiment of the present disclosure.

The first embodiment of the present disclosure discloses a sunken wheel-side motor drive axle, which comprises an axle beam assembly 8, drive motor assemblies, reducer assemblies and hub assemblies. The structure of wheel-side motor drive axle is shown in FIG. 1 and FIG. 2.

The drive motor assemblies include a left drive motor assembly 7 and a right drive motor assembly 15. The left drive motor assembly 7 and the right drive motor assembly 15 are symmetrically disposed at the bottom of the left and right ends of the axle beam assembly 8 respectively. By arranging the drive motor assemblies at the bottom of the axle beam assembly 8, the boundary A between the left and right symmetrically arranged brake chambers becomes the decisive factor for limiting the bus aisle width, thereby increasing the bus aisle width.

In addition, the drive motor assemblies transmit power to the reducer assemblies, and the reducer assemblies drive the hub assemblies to rotate. The reducer assemblies include a left reducer assembly and a right reducer assembly. The hub assemblies include a left hub assembly 2 and a right hub assembly 10. The left and right reducer assemblies and the left and right hub assemblies are left and right symmetrically arranged. The left drive motor assembly 7 transmits power to the left reducer assembly, and then the left reducer assembly drives the left hub assembly 2; the right drive motor assembly 15 transmits power to the right reducer assembly, and then the right reducer assembly drives the right hub assembly 10.

In a preferred embodiment, the drive motor assembly is an oil-cooled motor with small diameter, high power density and high rotation speed, so as to ensure large torque output and reduce the space occupied by the drive motor assembly. Of course, according to specific requirements, the drive motor assembly may be other small volume and high-power motors, and is not limited to oil-cooled motors.

In an embodiment, the reducer assemblies are provided with brake air chambers. The brake air chambers include a left brake air chamber 5 and a right brake air chamber 13. The left brake air chamber 5 is disposed on the left reducer assembly; the right brake air chamber 13 is disposed on the right reducer assembly. The brake air chambers cooperate with brake discs, and the bus aisle width is limited by the brake air chambers. As can be seen from FIG. 2, the boundary A between the left and right brake chambers becomes the decisive factor for limiting the width bus aisle.

In an embodiment, the brake discs are disposed on the inner side of the hub assemblies. The brake discs include a left brake disc 3 and a right brake disc 11. The left and right brake discs are symmetrically arranged on the inner side of the left and right hub assemblies respectively for braking the left and right hub assemblies.

In a preferred embodiment, the reducer assemblies comprise two first-stage reducer assemblies (left and right first-stage reducer assemblies), two second-stage reducer assemblies (left and right second-stage reducer assemblies) and two third-stage reducer assemblies (left and right third-stage reducer assemblies). The first-stage reducer assemblies, the second-stage reducer assemblies and the third-stage reducer assemblies are disposed on the left and right symmetrically. By providing first-stage reducers, second-stage reducers and third-stage reducers, the present disclosure realizes three-stage speed reducing transmission, and can effectively increase the transmission speed ratio, reduce the torque output requirements of the drive motor while ensuring the same wheel side driving torque, and further effectively reduce the size of the drive motor and reduce its occupied space, and thus further increase the bus aisle width.

In an embodiment, the output shaft of the drive motor assembly is connected with the driving gear of the first-stage reducer assembly through splines, the output shaft of the driven gear of the first-stage reducer assembly is connected with the driving gear of the second-stage reducer assembly, and the driven gear of the second-stage reducer assembly transmits power to the input end of the third-stage reducer assembly. The left drive motor assembly 7 transmits power to the left third-stage reduction assembly 1 through the power transmission process; the right drive motor assembly 15 transmits the power to the right third-stage reducer assembly 9 through the power transmission process. The motor output shaft of the drive motor assembly is connected with the driving gear of the first-stage reducer through external splines to transmit the power of the drive motor to the first-stage reducer assembly. The output shaft of the driven gear of the first-stage reducer is connected with the driving gear of the second-stage reducer to transmit power to the second-stage reducer assembly. Finally, the power is transmitted to the third-stage reducer through the intermediate shaft of the second-stage reducer and the output shaft of the driven gear eccentrically arranged from the driving gear.

The second-stage reducer assembly comprises a driving gear, an intermediate shaft and a driven gear. The intermediate shaft is meshed with the driving gear and driven gear respectively. The driving gear transmits power to the driven gear through the intermediate shaft, which can effectively increase the transmission speed ratio.

In an embodiment, the driven gear of the second-stage reducer assembly and the driving gear of the second-stage reducer assembly are eccentrically arranged. When the driven gear output shaft of the first-stage reducer assembly drives the driving gear of the second-stage reducer assembly to rotate, the driven gear of the second-stage reducer assembly also rotates.

In an embodiment, the input end and output end of the third-stage reducer are located on the same side. The third-stage reducer includes a sun gear, a planet gear and a ring gear. The sun gear is driven by the driven gear of the second-stage reducer assembly, the planet gear is meshed with the sun gear and fixed on a planet carrier, the planet gear is meshed with the ring gear, and the ring gear is meshed with the gear disc on the hub assembly, so as to drive the hub assembly to rotate. There are two sets of the above driving structure which are arranged symmetrically on the left and right.

In an embodiment, the drive motor assembly, the first-stage reducer assembly and the second-stage reducer assembly are lubricated by a spray condensation integrated cooling and lubrication system, so as to enhance the cooling and lubrication effect and improve the cooling and lubrication efficiency. Similarly, other lubrication systems with the same effect as the spray condensation integrated cooling and lubrication system may also be selected for lubrication.

In sum, the present disclosure discloses a sunken wheel-side motor drive axle, which comprises an axle beam assembly, drive motor assemblies, reducer assemblies and hub assemblies; the drive motor assemblies comprise a left drive motor assembly and a right drive motor assembly symmetrically disposed at a bottom of the left and right ends of the axle beam assembly respectively; and the drive motor assemblies transmit power to the reducer assemblies, and the reducer assemblies drive the hub assemblies to rotate. The wheel side electric drive axle in the present disclosure increases the transmission speed ratio through the three-stage speed reducing transmission, reduces the requirement for the output torque of the drive motor while ensuring the same wheel end drive torque, and thus can effectively reduce the size of the drive motor; the drive motors are arranged at the bottom of the axle beam assembly, thereby reducing the occupied space, increasing the aisle width of new energy commercial bus, and improving the comfort of passengers.

Second Embodiment

The present embodiment of the present disclosure also discloses a new energy vehicle comprising any one of the sunken wheel-side motor drive axles as stated above.

The above are only the specific implementation of the present disclosure, but the protection scope of the present disclosure is not limited to this. Any person skilled in the art can easily think of changes or substitutions within the technical scope disclosed by the present disclosure, which should be covered by the protection scope of the present disclosure.

In the description provided herein, many specific details are illustrated. However, it can be understood that embodiments of the present disclosure may be practiced without these specific details. In some instances, well-known methods, structures and techniques have not been shown in detail in order not to obscure the understanding of this description.

What is claimed is:

1. A sunken wheel-side motor drive axle, comprising:
an axle beam assembly; and
two drive motor assemblies, two reducer assemblies and two hub assemblies respectively disposed at left and right ends of the axle beam assembly;
wherein the drive motor assemblies are symmetrically disposed at a bottom of the left and right ends of the axle beam assembly, respectively; and
wherein the drive motor assemblies are configured to transmit power to the two reducer assemblies, and the two reducer assemblies are configured to drive the two hub assemblies to rotate, and
wherein the two reducer assemblies include brake air chambers that cooperate with brake discs, and a bus aisle width is limited by the brake air chambers.

2. The wheel-side motor drive axle according to claim 1, wherein the drive motor assembly comprises an oil-cooled motor.

3. The motor drive axle according to claim 1, wherein the brake discs are disposed at an inner side of the two hub assemblies.

4. The wheel-side motor drive axle according to claim 1, wherein the reducer assemblies comprise two first-stage reducer assemblies, two second-stage reducer assemblies and two third-stage reducer assemblies, and the first-stage reducer assemblies, the second-stage reducer assemblies and the third-stage reducer assemblies are arranged symmetrically on the left and right.

5. A new energy vehicle comprising the sunken wheel-side motor drive axle according to claim 1.

6. A new energy vehicle comprising the sunken wheel-side motor drive axle according to claim 2.

7. A new energy vehicle comprising the sunken wheel-side motor drive axle according to claim 3.

8. A new energy vehicle comprising the sunken wheel-side motor drive axle according to claim 4.

9. A sunken wheel-side motor drive axle, comprising:
an axle beam assembly; and
two drive motor assemblies, two reducer assemblies and two hub assemblies respectively disposed at left and right ends of the axle beam assembly,
wherein the two drive motor assemblies are symmetrically disposed at a bottom of the left and right ends of the axle beam assembly, respectively,
wherein the two drive motor assemblies are configured to transmit power to the two reducer assemblies, and the two reducer assemblies are configured to drive the two hub assemblies to rotate,
wherein the two reducer assemblies includes a first-stage reducer assembly, a second-stage reducer assembly and a third-stage reducer assembly,
wherein an output shaft of the drive motor assemblies is connected with a driving gear of the first-stage reducer assembly through splines, and a driven gear output shaft of the first-stage reducer assembly is connected with a driving gear of the second-stage reducer assembly, a driven gear of the second-stage reducer assembly transmits power to an input end of the third-stage reducer assembly, and
wherein the second-stage reducer assembly comprises a driving gear, an intermediate shaft and a driven gear, and the intermediate shaft is meshed with the driving gear and the driven gear respectively.

10. The wheel-side motor drive axle according to claim 9, wherein the driven gear of the second-stage reducer assembly and the driving gear of the second-stage reducer assembly are eccentrically arranged.

11. The wheel-side motor drive axle according to claim 9, wherein an input end and an output end of the third-stage reducer are located on a same side, the third-stage reducer comprises a sun gear, a planet gear and a ring gear, the sun gear is driven by the driven gear of the second-stage reducer assembly, the planet gear is meshed with the sun gear and fixed on a planet carrier, the planet gear is meshed with the ring gear, and the ring gear is meshed with a gear disc on the hub assembly to drive the hub assembly to rotate.

12. The wheel-side motor drive axle according to claim 9, wherein the drive motor assemblies, the first-stage reducer assembly and the second-stage reducer assembly are lubricated by a spray condensation integrated cooling and lubrication system.

13. A new energy vehicle comprising the sunken wheel-side motor drive axle according to claim 9.

14. A new energy vehicle comprising the sunken wheel-side motor drive axle according to claim 10.

15. A new energy vehicle comprising the sunken wheel-side motor drive axle according to claim 11.

16. A new energy vehicle comprising the sunken wheel-side motor drive axle according to claim 12.

\* \* \* \* \*